(12) United States Patent
Aponte et al.

(10) Patent No.: US 9,007,367 B2
(45) Date of Patent: Apr. 14, 2015

(54) WAGERING GAME SYSTEM WITH STEREOSCOPIC 3-D GRAPHICS

(75) Inventors: Peter J. Aponte, Las Vegas, NV (US); Michael J. Irby, II, Chicago, IL (US); Sean P. Kelly, Chicago, IL (US); Brian D. Manning, Las Vegas, NM (US); Anthony J. W. Prohl, Romeoville, IL (US); Craig J. Sylla, Round Lake, IL (US); John L. Walsh, Gurnee, IL (US)

(73) Assignee: WMS Gaming, Inc., Waukegan, IL (US)

( * ) Notice: Subject to any disclaimer, the term of this patent is extended or adjusted under 35 U.S.C. 154(b) by 191 days.

(21) Appl. No.: 13/822,617

(22) PCT Filed: Nov. 12, 2011
(Under 37 CFR 1.47)

(86) PCT No.: PCT/US2011/060498
§ 371 (c)(1),
(2), (4) Date: Mar. 12, 2013

(87) PCT Pub. No.: WO2012/065147
PCT Pub. Date: May 18, 2012

(65) Prior Publication Data
US 2013/0303284 A1 Nov. 14, 2013

Related U.S. Application Data

(60) Provisional application No. 61/413,157, filed on Nov. 12, 2010.

(51) Int. Cl.
*G06T 15/00* (2011.01)
*G07F 17/32* (2006.01)

(52) U.S. Cl.
CPC .................. *G07F 17/3211* (2013.01)

(58) Field of Classification Search
CPC .......... G06T 15/00–15/87; G06T 19/00–19/20
USPC ................................... 345/419–427
See application file for complete search history.

(56) References Cited

U.S. PATENT DOCUMENTS

| 6,809,745 | B1 | 10/2004 | O'Donnell et al. |
| 2008/0188303 | A1 | 8/2008 | Schlottmann et al. |
| 2008/0188304 | A1 | 8/2008 | Escalera et al. |
| 2009/0061983 | A1 | 3/2009 | Kaufman |
| 2009/0102834 | A1 | 4/2009 | Tomite et al. |

FOREIGN PATENT DOCUMENTS

WO WO-2012065147 5/2012

OTHER PUBLICATIONS

"PCT Application No. PCT/US11/60498 International Preliminary Report on Patentability", Nov. 30, 2012, 10 pages.
"PCT Application No. PCT/US11/60498 International Search Report", Mar. 26, 2012, 10 pages.

*Primary Examiner* — Charles Tseng
(74) *Attorney, Agent, or Firm* — DeLizio Gilliam, PLLC

(57) ABSTRACT

This document describes techniques for processing graphics in wagering game systems. Some embodiments of the inventive subject matter use stereoscopic 3-D graphics and 2-D graphics to present composite images including multiple views of a virtual 3-D wagering game environment. Such embodiments present the composite images on stereoscopic 3-D devices.

25 Claims, 7 Drawing Sheets

WAGERING GAME SYSTEM WITH STEREOSCOPIC 3-D GRAPHICS

RELATED APPLICATIONS

This application claims the priority benefit of U.S. Provisional Application Ser. No. 61/413,157 filed Nov. 12, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to wagering game systems, and more particularly to wagering game systems that present three-dimensional stereoscopic graphical content.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, an apparatus comprises a stereoscopic three-dimensional display device; a graphics unit in communication with the stereoscopic three-dimensional display device, the graphics unit configured to create a three-dimensional (3-D) wagering game space includes a first group of objects; create a second group of objects that are a copy of the first group of objects, wherein the second group of objects includes invisible objects; capture a stereoscopic 3-D image in the 3-D wagering game space, wherein the first image includes some objects from the first group of objects; capture a two-dimensional (2-D) image in the 3-D wagering game space, wherein the second image does not include the invisible objects such that a region in the second image is transparent; create a composite image wherein the stereoscopic 3-D image appears in the region of the 2-D image; present the composite image on the stereoscopic 3-D display device; a wagering game unit configured to provide results of wagering games to the graphics unit for presentation on the stereoscopic 3-D display device.

In some embodiments, the graphics unit creates a first group of virtual cameras to create the stereoscopic 3-D image.

In some embodiments, the graphics unit creates a second group of virtual cameras to create the stereoscopic 3-D image.

In some embodiments, the first group of objects are elements of a wagering game, wherein the elements indicate a result of the wagering game.

In some embodiments, the invisible objects are also elements of the wagering game.

In some embodiments, a method comprises creating a first virtual three-dimensional (3-D) wagering game space includes a first group of objects; creating a second virtual 3-D wagering game space includes a second group of objects, wherein the second group of objects is identical to the first group of objects, and wherein some of the second group of objects are marked as invisible; making the first virtual 3-D wagering game space visible to a pair of virtual cameras; making the second virtual 3-D wagering game space visible to a single virtual camera; rendering a stereoscopic 3-D image to a graphics buffer, wherein the rendering the stereoscopic 3-D image is based on data captured by the pair of virtual cameras; rendering a two-dimensional (2-D) image to the graphics buffer, wherein the rendering the 2-D image is based on data captured by the single virtual camera; presenting the graphics buffer on a stereoscopic 3-D display device.

In some embodiments, the graphics buffer includes a composite image includes the 2-D image and the stereoscopic 3-D image.

In some embodiments, the rendering the 2-D image includes performing rendering computations for some of the second group of objects that have not been marked invisible; avoiding rendering computations for the ones of the second group of objects that are marked invisible.

In some embodiments, the method further comprises making the second virtual 3-D wagering game space visible to a second pair virtual cameras; rendering another stereoscopic 3-D image to the graphics buffer, wherein the rendering the other stereoscopic 3-D image is based on data captured by the second pair of virtual cameras;

In some embodiments, the first and second groups of objects represent game elements in a wagering game.

In some embodiments, a method comprises creating a first virtual three-dimensional (3-D) wagering game space includes a first group of game elements, wherein all game elements in the first group are visible to a first group of virtual cameras; creating a second virtual 3-D wagering game space includes a second group of game elements, wherein the second group of game elements is identical to the first group of game elements, and wherein some of the second group of game elements are invisible to the second group of virtual cameras; rendering, to a graphics buffer, a stereoscopic 3-D image based on images captured by the first group of cameras, wherein the images include one or more of the first group of game elements; rendering, to the graphics buffer, a 2-D image based on an image captured by the second group of cameras, wherein the image does not include any of the second group of game elements that are invisible to the second group of cameras; and presenting the graphics buffer on a stereoscopic 3-D display device.

In some embodiments, the first and second groups of game elements are part of a wagering game.

In some embodiments, presentation of the graphics buffer results in a composite image includes the stereoscopic 3-D image and the 2-D image.

In some embodiments, the rendering, to the graphics buffer, the 2-D image does not include computations for the game elements in the second group that are invisible to the second group of cameras.

In some embodiments, one or more machine-readable storage media includes instructions which when executed by one or more processors cause the one or more processors to perform operations comprises creating a virtual 3-D wagering game space includes a region and a plurality of objects; labeling the region invisible and an object of the plurality of objects invisible; capturing, by a first pair of virtual cameras, a first image in the virtual 3-D wagering game space, wherein the first image includes objects other than the object labeled invisible; capturing, by a second virtual camera, a second image in the virtual 3-D wagering game space, wherein the second image includes the region and the objected labeled invisible, and wherein the region and object labeled invisible are transparent in the second image; rendering, based on the first image, a stereoscopic 3-D image to a graphics buffer; rendering, based on the second image, a 2-D image to the graphics buffer; presenting the graphics buffer on a stereoscopic 3-D display device.

In some embodiments, the objects represent elements in a wagering game.

In some embodiments, the presenting the graphics buffer presents a result for the wagering game.

In some embodiments, the first pair of virtual cameras and the second virtual camera have settings includes one or more of field of view, depth of focus, aperture size, and depth of field.

In some embodiments, the stereoscopic 3-D display displays the graphics buffer in autostereoscopic 3-D.

In some embodiments, presentation of the graphics buffer results in a composite image includes the stereoscopic 3-D image and the 2-D image.

In some embodiments, an apparatus comprises means for creating a first virtual three-dimensional (3-D) wagering game space includes a first group of objects; means for creating a second virtual 3-D wagering game space includes a second group of objects, wherein the second group of objects is identical to the first group of objects, and wherein some of the second group of objects are marked as invisible; means for making the first virtual 3-D wagering game space visible to a pair of virtual cameras; means for making the second virtual 3-D wagering game space visible to a single virtual camera; means for rendering a stereoscopic 3-D image to a graphics buffer, wherein the rendering the stereoscopic 3-D image is based on data captured by the pair of virtual cameras; means for rendering a two-dimensional (2-D) image to the graphics buffer, wherein the rendering the 2-D image is based on data captured by the single virtual camera; means for presenting the graphics buffer on a stereoscopic 3-D display device.

In some embodiments, the graphics buffer includes a composite image includes the 2-D image and the stereoscopic 3-D image.

In some embodiments, means for the rendering the 2-D image includes means for performing rendering computations for some of the second group of objects that have not been marked invisible; means for avoiding rendering computations for the ones of the second group of objects that are marked invisible.

In some embodiments, the apparatus further comprises means for making the second virtual 3-D wagering game space visible to a second pair virtual cameras; means for rendering another stereoscopic 3-D image to the graphics buffer, wherein the rendering the other stereoscopic 3-D image is based on data captured by the second pair of virtual cameras;

In some embodiments, the first and second groups of objects represent game elements in a wagering game.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes example wagering game machine architectures. The third section describes example operations performed by some embodiments and the fourth section describes example wagering game machines in more detail. The fifth section presents some general comments.

Introduction

This section provides an introduction to some embodiments of the invention.

As noted above, wagering game designers are continuously developing new ways to make wagering games more fun and entertaining One way to add visual appeal to wagering games is to present wagering game content using stereoscopic three-dimensional graphics. Stereoscopic three-dimensional graphics appear to have depth, so graphical objects appear to hover in space, in front of display monitors. Although stereoscopic three-dimensional (3-D) graphics may be visually appealing, presenting stereoscopic 3-D graphics may require vast processing power and other computing resources.

Some embodiments of the inventive subject matter use stereoscopic 3-D graphics and 2-D graphics to present composite images including multiple views of a virtual 3-D wagering game environment. Some embodiments derive efficiencies by marking objects in the virtual 3-D environment as transparent or otherwise invisible. By marking the objects as transparent, rendering components (e.g., hardware and software) can avoid certain computations when creating the multiple views of the 3-D virtual wagering game environment. As a result, embodiments facilitate more efficient rendering of multi-view images that include 2-D and stereoscopic 3-D graphics.

Figure 1:
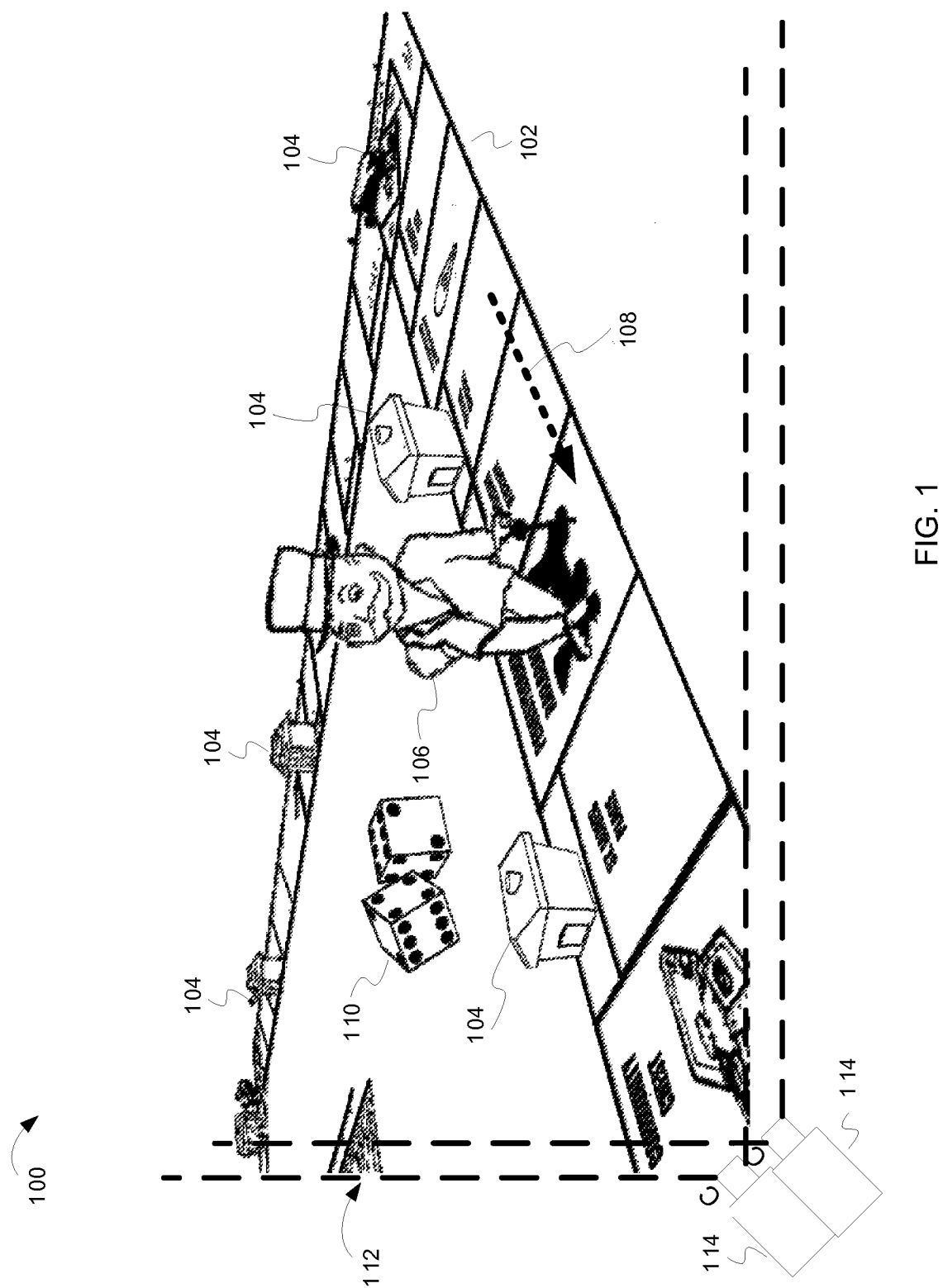
FIG. 1 illustrates an example virtual 3-D wagering game environment.
Figure 2:
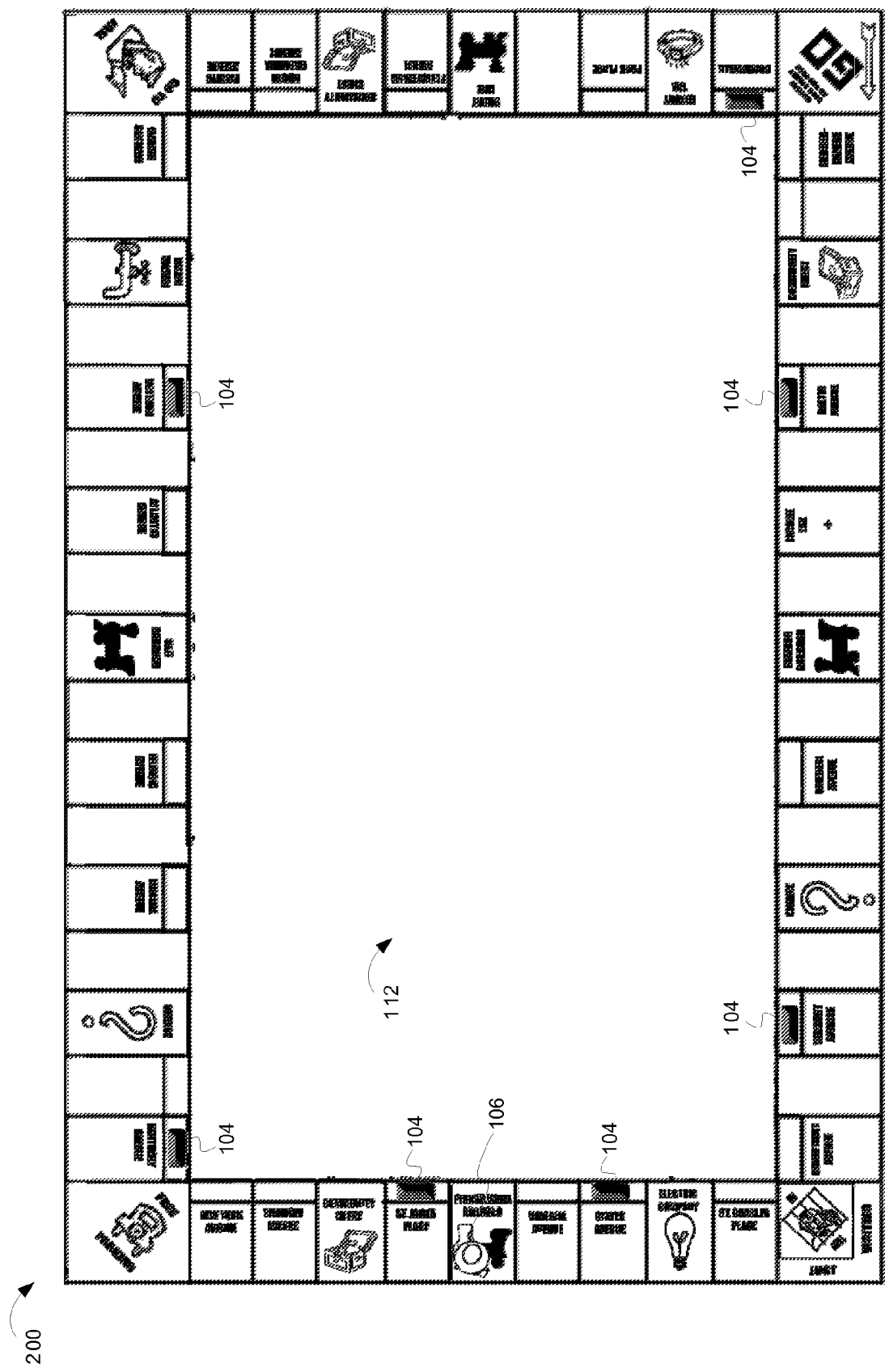
FIG. 2 shows an overhead view of a virtual 3-D wagering game environment.

The following discussion of FIGS. 1 and 2 will describe how some embodiments create multi-view images of 3-D wagering game environments. The discussion will also refer to multi-view images as composite images.

According to some embodiments, wagering games present scenes from virtual 3-D wagering game environments. For example, a spinning-reels slots game may include a bonus game that presents scenes from a virtual 3-D wagering game environment. FIG. 1 illustrates an example virtual 3-D wagering game environment. In FIG. 1, a virtual 3-D wagering game environment 100 includes a game board 102, game tokens 104, dice 110, and a game character 106. The environment 100 includes more objects than what appears in FIG. 1. For example, the environment 100 may include more game tokens, other parts of the game board 102, etc.

FIG. 2 shows an overhead view of a virtual 3-D wagering game environment. More specifically, FIG. 2 shows an overhead view of the virtual 3-D wagering game environment 100. The overhead view shows the game board 102, game character 106, and game tokens 104.

As part of a bonus game, a wagering game may present graphics from the 3-D virtual wagering game environment 100. For example, the bonus game may reveal its result by presenting graphics showing the game character 106 walking around the game board 102, and stopping at a position on the board 102 (see arrow 108). The bonus game may give bonus awards based on the position at which the game character 106 stopped. To enhance presentation of the bonus game, the wagering game can present composite images including different views of the virtual 3-D wagering game environment 100. For example, in presenting the bonus game, the wagering game can present a series of composite images including two views of the game character 106 walking around the game board 102. In some instances, one view in the composite image is rendered in 2-D (e.g., the view may appear as simulated 3-D), whereas another view in the composite image is rendered in stereoscopic 3-D.

Figure 3:
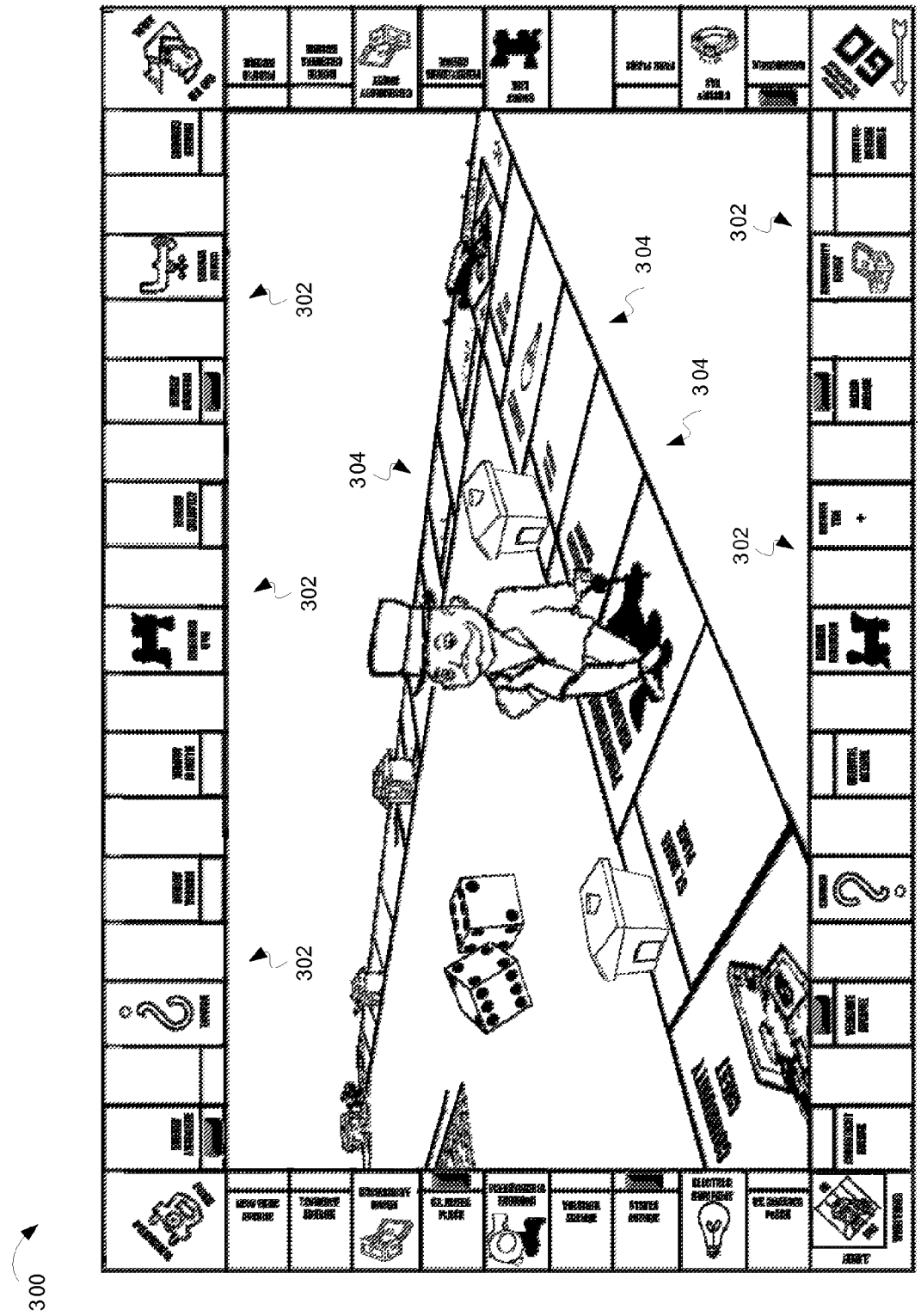
FIG. 3 illustrates a composite image including multiple views of a 3-D virtual wagering game environment.

FIG. 3 illustrates a composite image including multiple views of a virtual 3-D wagering game environment. In FIG. 3, a composite image 300 includes the overhead view from FIG. 2 (shown in FIG. 3 as overhead image 302), and the perspective view from FIG. 1 (shown in FIG. 3 as perspective image 304). When rendered on a 3-D stereoscopic display device, the overhead image 302 appears in 2-D, and the perspective image 302 appears in stereoscopic 3-D. Thus, the overhead image 302 appears as it would on a standard 2-D display device. However, the perspective image 302 has the illusion of depth. In presenting the bonus game, the wagering game can present a series of composite images that show the game character 106 moving about the game board 102.

In some embodiments, the composite image includes a 2-D overhead view and a stereoscopic 3-D perspective view. However, in other embodiments, composite images can include two or more views from any perspective in the 3-D virtual wagering game environment. Furthermore, each view can be rendered in 2-D or stereoscopic 3-D. As a result, some composite images can include two or more perspective views, all rendered in stereoscopic 3-D.

This discussion will continue with a description of components included in some embodiments of the inventive subject matter. The discussion will then describe example operations for rendering a composite image showing multiple views of a virtual 3-D wagering game environment.

Operating Environment

This section describes an example operating environment and presents structural aspects of some embodiments. This section includes discussion about wagering game machine architectures, and wagering game networks.

Wagering Game Machine Architectures

Figure 4:
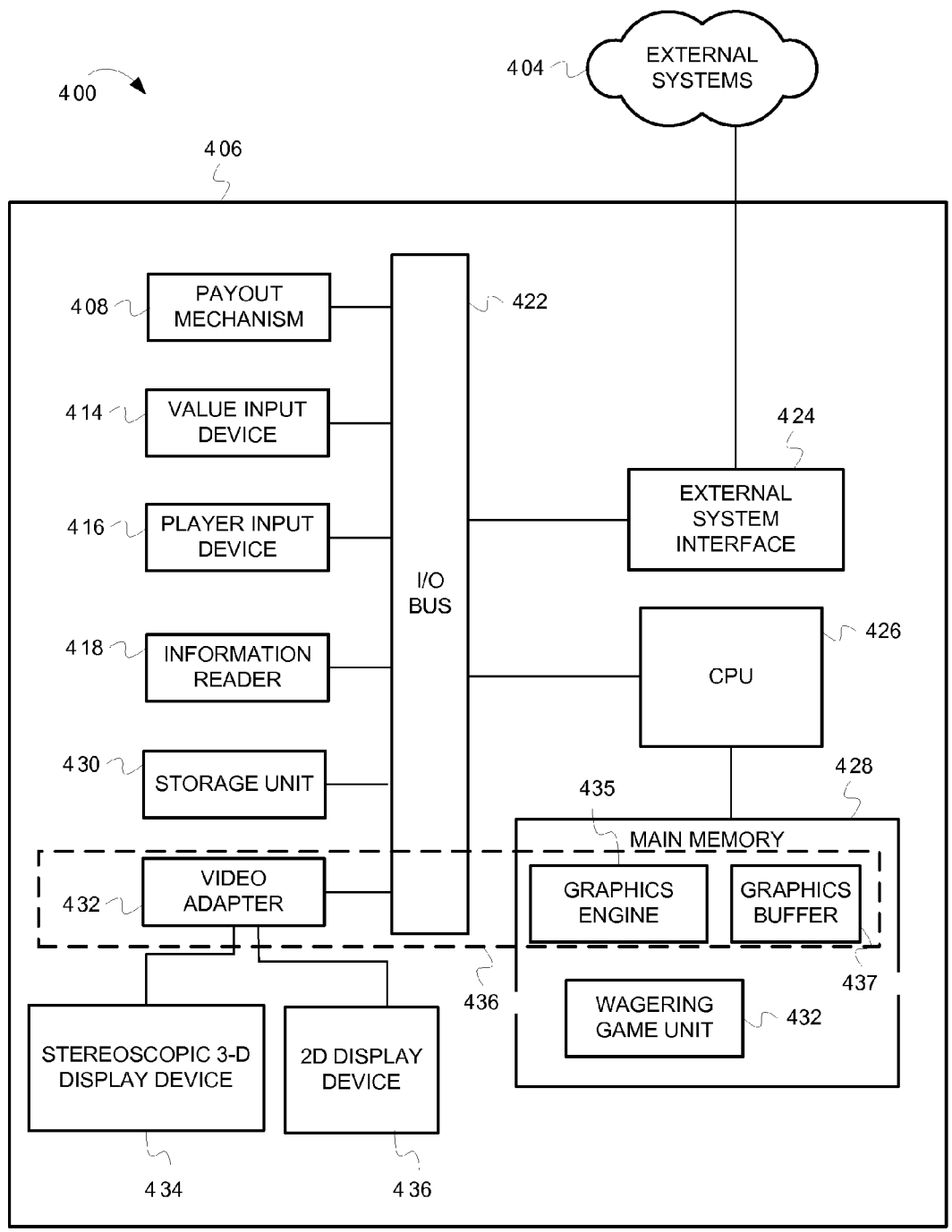
FIG. 4 is a block diagram illustrating a wagering game machine architecture, according to example embodiments of the invention.

FIG. 4 is a block diagram illustrating a wagering game machine architecture, according to example embodiments of the invention. As shown in FIG. 4, the wagering game machine architecture 400 includes a wagering game machine 406, which includes a central processing unit (CPU) 426 connected to main memory 428. The CPU 426 can include one or more processors, such as one or more Intel® Pentium processors, Intel® Core 2 Duo processors, AMD Opteron™ processors, UltraSPARC processors, etc. The main memory 428 includes a wagering game unit 432. In one embodiment, the wagering game unit 432 can present wagering games, such as video poker, video black jack, video slots, video lottery, etc., in whole or part.

The main memory 428 also includes a graphics engine 436 that can use stereoscopic 3-D graphics and 2-D graphics to present composite images that include multiple views of a virtual 3-D wagering game environment. The graphics engine 435 can operate in concert with a video adapter 432 and graphics buffer 437, which together make up a graphics unit 436. The graphics unit 436 presents composite images on a stereoscopic 3-D display device 434. The video adapter 432 is connected to a 2-D display device. Operations of the graphics unit 436 and video adapter 432 are described in more detail below.

Embodiments of the stereoscopic 3-D display device can support any of the following technologies: anaglyph images, polarized projections, autostereoscopic displays, computer-generated holography, volumetric displays, infrared laser projections, side-by-side viewing, autostereograms, pulfrich effects, prismatic & self-masking crossview glasses, lenticular prints, displays with filter arrays, wiggle stereoscopy, active 3D viewers (e.g., liquid crystal shutter glasses, red eye shutterglasses, virtual reality headsets, personal media viewers, etc.), passive 3D viewers (e.g., linearly polarized glasses, circularly polarized glasses, interference filter technology glasses, complementary color anaglyphs, compensating diopter glasses for red-cyan method, ColorCode 3D, ChromaDepth method and glasses, Anachrome "compatible" color anaglyph method, etc.), 3D televisions, etc.

The CPU 426 is also connected to an input/output (I/O) bus 422, which can include any suitable bus technologies, such as an AGTL+ frontside bus and a PCI backside bus. The I/O bus 422 is connected to a payout mechanism 408, value input device 414, player input device 416, information reader 418, storage unit 430, and the video adapter. The player input device 416 can include the value input device 414 to the extent the player input device 416 is used to place wagers. The I/O bus 422 is also connected to an external system interface 424, which is connected to external systems 404 (e.g., wagering game networks).

In one embodiment, the wagering game machine 406 can include additional peripheral devices and/or more than one of each component shown in FIG. 4. For example, in one embodiment, the wagering game machine 406 can include multiple external system interfaces 424 and/or multiple CPUs 426. In one embodiment, any of the components can be integrated or subdivided.

Any component of the architecture 400 can include hardware, firmware, and/or machine-readable storage media including instructions for performing the operations described herein. Machine-readable storage media includes any mechanism that stores information in a form readable by a machine (e.g., a wagering game machine, computer, etc.). For example, machine-readable media include read only memory (ROM), random access memory (RAM), magnetic disk storage media, optical storage media, flash memory machines, etc.

Example Operations

This section describes operations associated with some embodiments of the invention. In the discussion below, the flow diagrams will be described with reference to the wagering game machine presented above. However, in some embodiments, the operations can be performed by components not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 5:
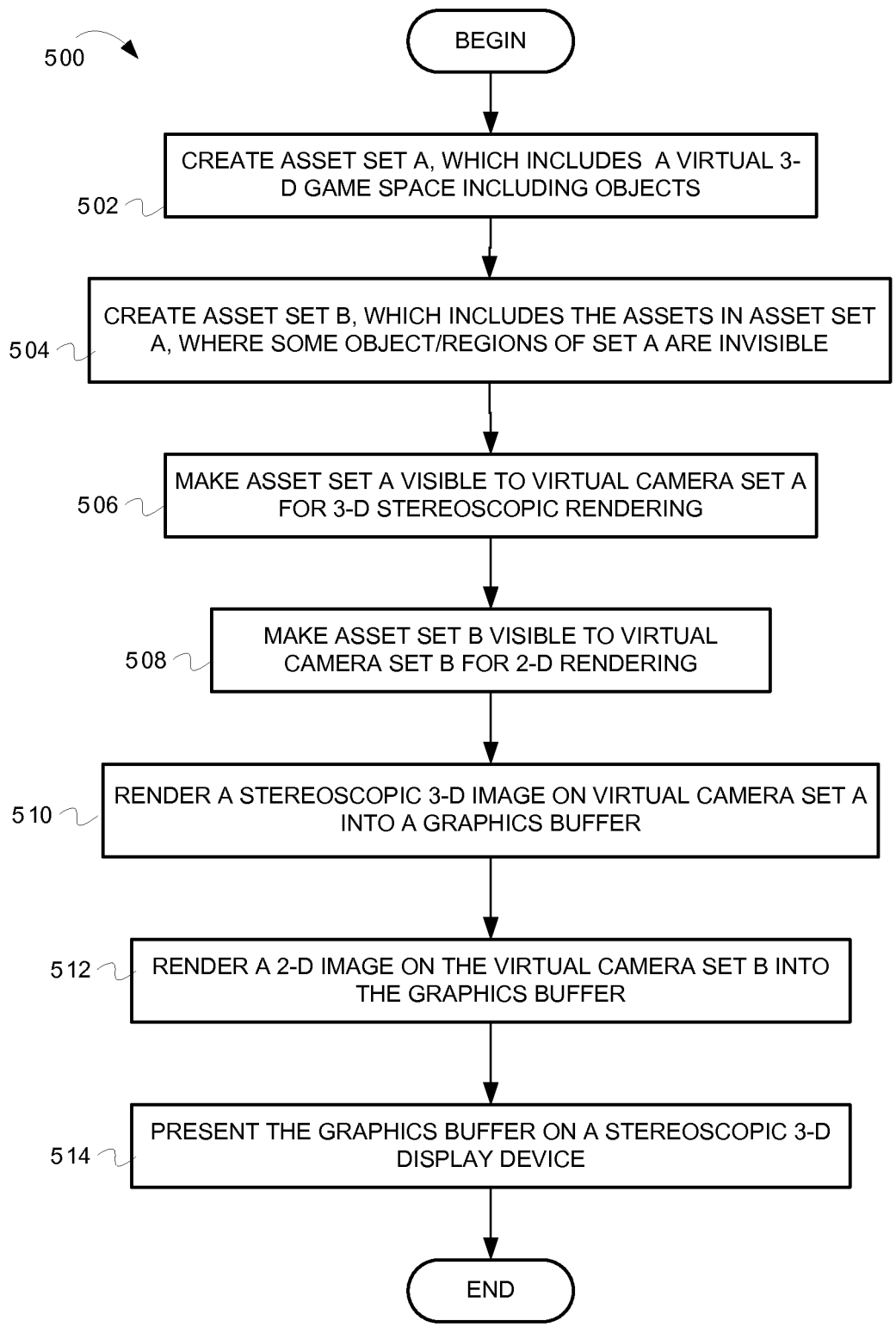
FIG. 5 is a flow diagram illustrating operations for rendering a composite image including multiple views of a virtual 3-D game space, according to some embodiments of the invention.

FIG. 5 is a flow diagram illustrating operations for rendering a composite image including multiple views of a virtual 3-D game space, according to some embodiments of the invention. In the following discussion, the operations are performed by components of a wagering game machine. In FIG. 5, a flow 500 begins at block 502.

At block 502, a wagering game machine's graphics unit 436 creates a virtual 3-D game space that includes objects. For example, the virtual 3-D game space can be a virtual space including a game board, game tokens, a game character, and other game-related objects (e.g., see FIG. 1). This virtual 3-D game space and objects residing therein constitute Asset Set A. The flow continues at block 504.

At block 504, the wagering game machine's graphics unit 436 creates another set of assets—Asset Set B. Asset set B includes all assets in Asset Set A, where one or more objects and/or regions are marked as transparent or otherwise invisible. For example, in reference to FIG. 2, Asset Set B includes the game board 102, game tokens 104, and game character 106, of Asset Set A. However, in Asset Set B, a region 112 of the game board 102 is marked as invisible, and so are the dice 110 (shown in FIG. 1). Because objects and regions in Asset Set B are identified as being invisible, the graphics unit 436 can ignore the invisible objects and regions when rendering objects in Asset Set B. Making the region 112 and dice 106 invisible in FIG. 2 creates a "window" in which the graphics unit 436 can overlay or otherwise present stereoscopic 3-D graphics, such as gaming animation and other content. The flow continues at block 506.

At block 506, the graphics unit 436 makes Asset Set A visible to a set of virtual cameras (Camera Set A) for stereoscopic 3-D rendering. The virtual cameras in Camera Set A can be positioned and oriented anywhere in Asset Set A (e.g., see virtual cameras 114 in FIG. 1). For example, the virtual cameras 114 can be positioned and oriented where they capture the objects shown in FIG. 1. The virtual cameras behave like real-world cameras, as they may have focal length, depth of field, shutter speed, resolution, aperture size, etc. For stereoscopic 3-D, two virtual cameras are necessary. A first virtual camera records a first image for presentation to a viewer's left eye, whereas a second virtual camera records a second image for presentation to the viewer's right eye. The flow continues at block 508.

At block 508, the graphics unit 436 makes Asset Set B visible to another virtual camera (Camera Set B) for 2-D rendering. The virtual camera(s) in Camera Set B can be positioned and oriented anywhere in Asset Set B. For example, the virtual camera(s) can be positioned and oriented, in Asset Set B, to capture an overhead view, as shown in FIG. 2. In some embodiments, Camera Set B includes two virtual cameras, so the graphics unit 436 may render a view of Asset Set B in stereoscopic 3-D. The flow 500 continues at block 510.

At block 510, based on Camera Set A, the graphics unit 436 renders a stereoscopic 3-D image of Asset Set A into a graphics buffer. FIG. 1 shows an example of what such a stereoscopic 3-D image of Asset Set A may look like. However, it should be understood that FIG. 1 is not a stereoscopic 3-D image. The stereoscopic 3-D image in the graphics buffer includes a first 2-D image for presentation to a viewer's left eye, and a second 2-D image for presentation to the viewer's right eye. When presented on a stereoscopic 3-D display device, the first and second images appear as a stereoscopic 3D image, having an illusion of depth. The flow continues at block 512.

At block 512, based on Camera Set B, the graphics unit 436 renders a 2-D image of the Asset Set B into the graphics buffer. FIG. 2 shows an example of what such a 2-D image of Asset Set B may look like. As noted above, some objects and regions in Asset Set B have been marked as invisible. As a result, the graphics unit 436 need not expend processing resources rendering those objects and regions. In some embodiments, graphics unit 436 can render a stereoscopic 3-D view from the Asset Set B. The flow continues at block 514.

At this point in the flow 500, the graphics unit 436 has created a composite image in the graphics buffer. The composite image is comprised of the stereoscopic 3-D image created at block 510, and the 2-D image created at block 512. As noted above, the graphics unit 436 can avoid rendering invisible objects and/or regions. By not rendering certain objects, the graphics unit 426 can create the composite image more efficiently. Moreover, not rendering certain objects, and rendering the remaining directly to the graphics buffer (or to a different buffer for transparent objects) allows the graphics unit 436 to avoid logically ambiguous and mechanically tedious operations of determining which portions of an opaque real-time image (or a pre-rendered image) to "cut out" (i.e., make transparent) before overlaying the image.

At block 514, the graphics unit 436 presents the contents of the graphics buffer on the stereoscopic 3-D display device 434. FIG. 3 shows an example of what such a presentation of the graphics buffer may look like. However, as noted above, it should be understood that FIG. 3 does not depict a stereoscopic 3-D image. From block 514, the flow ends.

In the discussion of blocks 510 and 512, the graphics unit 436 renders images to a single graphics buffer. However, in some embodiments, the graphics unit 436 can render the stereoscopic 3-D image to the graphics buffer, while rendering the 2-D image to a second buffer. For embodiments that use two buffers, the graphics unit 436 overlays the second buffer onto the graphics buffer before presenting the composite image on a stereoscopic 3-D display device.

More about Wagering Game Machines

Figure 6:
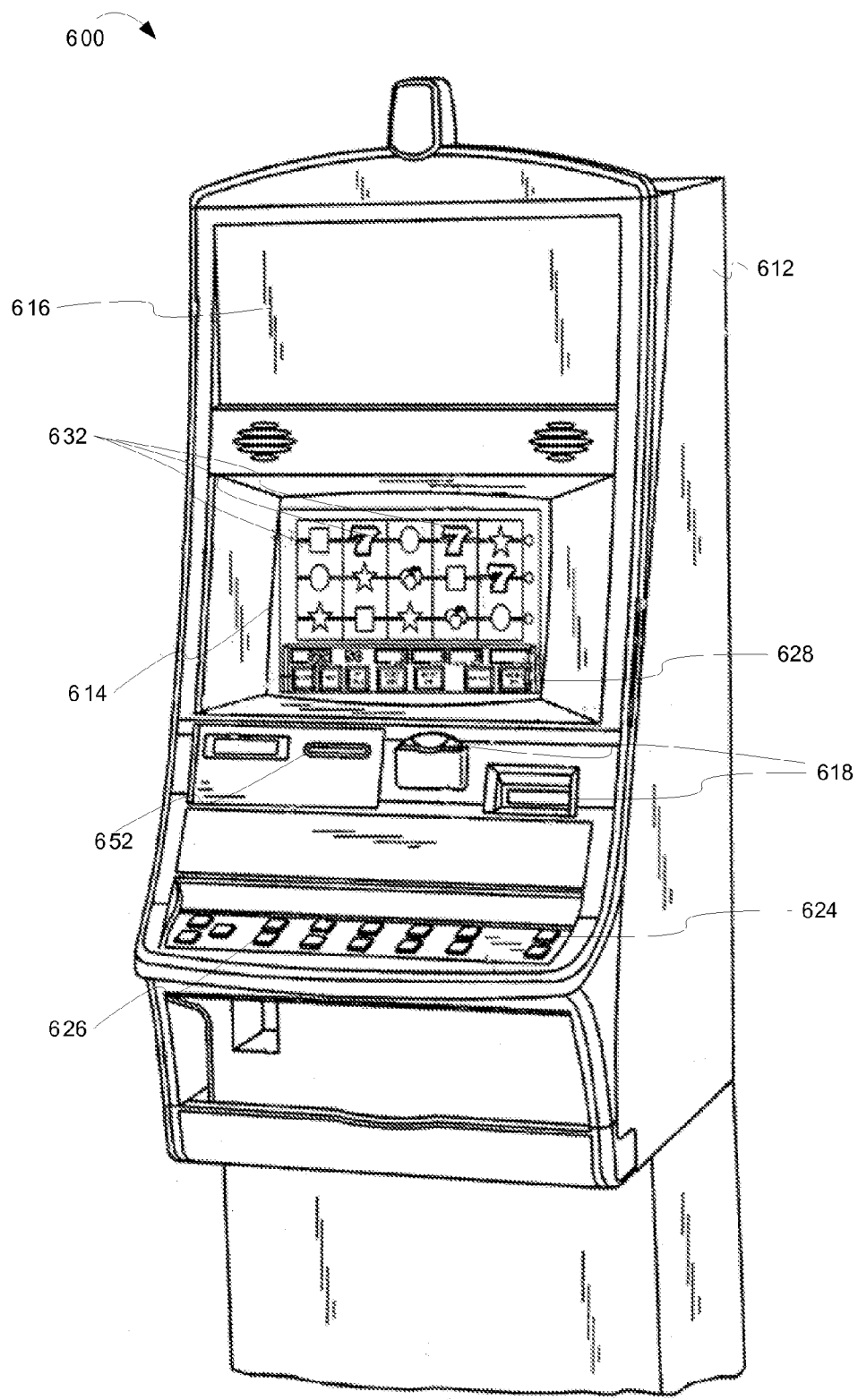
FIG. 6 is a perspective view of a wagering game machine, according to example embodiments of the invention.

FIG. 6 is a perspective view of a wagering game machine, according to example embodiments of the invention. Referring to FIG. 6, a wagering game machine 600 is used in gaming establishments, such as casinos. According to embodiments, the wagering game machine 600 can be any type of wagering game machine and can have varying structures and methods of operation. For example, the wagering game machine 600 can be an electromechanical wagering game machine configured to play mechanical slots, or it can be an electronic wagering game machine configured to play video casino games, such as blackjack, slots, keno, poker, blackjack, roulette, etc.

The wagering game machine 600 comprises a housing 612 and includes input devices, including value input devices 618 and a player input device 624. For output, the wagering game machine 600 includes a primary display 614 for displaying information about a basic wagering game. The primary display 614 can also display information about a bonus wagering game and a progressive wagering game. The wagering game machine 600 also includes a secondary display 616 for displaying wagering game events, wagering game outcomes, and/or signage information. While some components of the wagering game machine 600 are described herein, numerous other elements can exist and can be used in any number or combination to create varying forms of the wagering game machine 600.

The value input devices 618 can take any suitable form and can be located on the front of the housing 612. The value input devices 618 can receive currency and/or credits inserted by a player. The value input devices 618 can include coin acceptors for receiving coin currency and bill acceptors for receiving paper currency. Furthermore, the value input devices 618 can include ticket readers or barcode scanners for reading information stored on vouchers, cards, or other tangible portable storage devices. The vouchers or cards can authorize access to central accounts, which can transfer money to the wagering game machine 600.

The player input device 624 comprises a plurality of push buttons on a button panel 626 for operating the wagering game machine 600. In addition, or alternatively, the player input device 624 can comprise a touch screen 628 mounted over the primary display 614 and/or secondary display 616.

The various components of the wagering game machine 600 can be connected directly to, or contained within, the housing 612. Alternatively, some of the wagering game machine's components can be located outside of the housing 612, while being communicatively coupled with the wagering game machine 600 using any suitable wired or wireless communication technology.

The operation of the basic wagering game can be displayed to the player on the primary display 614. The primary display 614 can also display a bonus game associated with the basic wagering game. The primary display 614 can any suitable autostereoscopic display device. In FIG. 6, the wagering game machine 600 is an "upright" version in which the primary display 614 is oriented vertically relative to the player. Alternatively, the wagering game machine can be a "slant-top" version in which the primary display 614 is slanted at about a thirty-degree angle toward the player of the wagering game machine 600. In yet another embodiment, the wagering game machine 600 can exhibit any suitable form factor, such as a free standing model, bartop model, mobile handheld model, or workstation console model.

A player begins playing a basic wagering game by making a wager via the value input device 618. The player can initiate play by using the player input device's buttons or touch screen 628. The basic game can include arranging a plurality of symbols along a payline 632, which indicates one or more outcomes of the basic game. Such outcomes can be randomly selected in response to player input. At least one of the outcomes, which can include any variation or combination of symbols, can trigger a bonus game.

In some embodiments, the wagering game machine 600 can also include an information reader 652, which can include a card reader, ticket reader, bar code scanner, RFID transceiver, or computer readable storage medium interface. In some embodiments, the information reader 652 can be used to award complimentary services, restore game assets, track player habits, etc.

Wagering Game Networks

Figure 7:
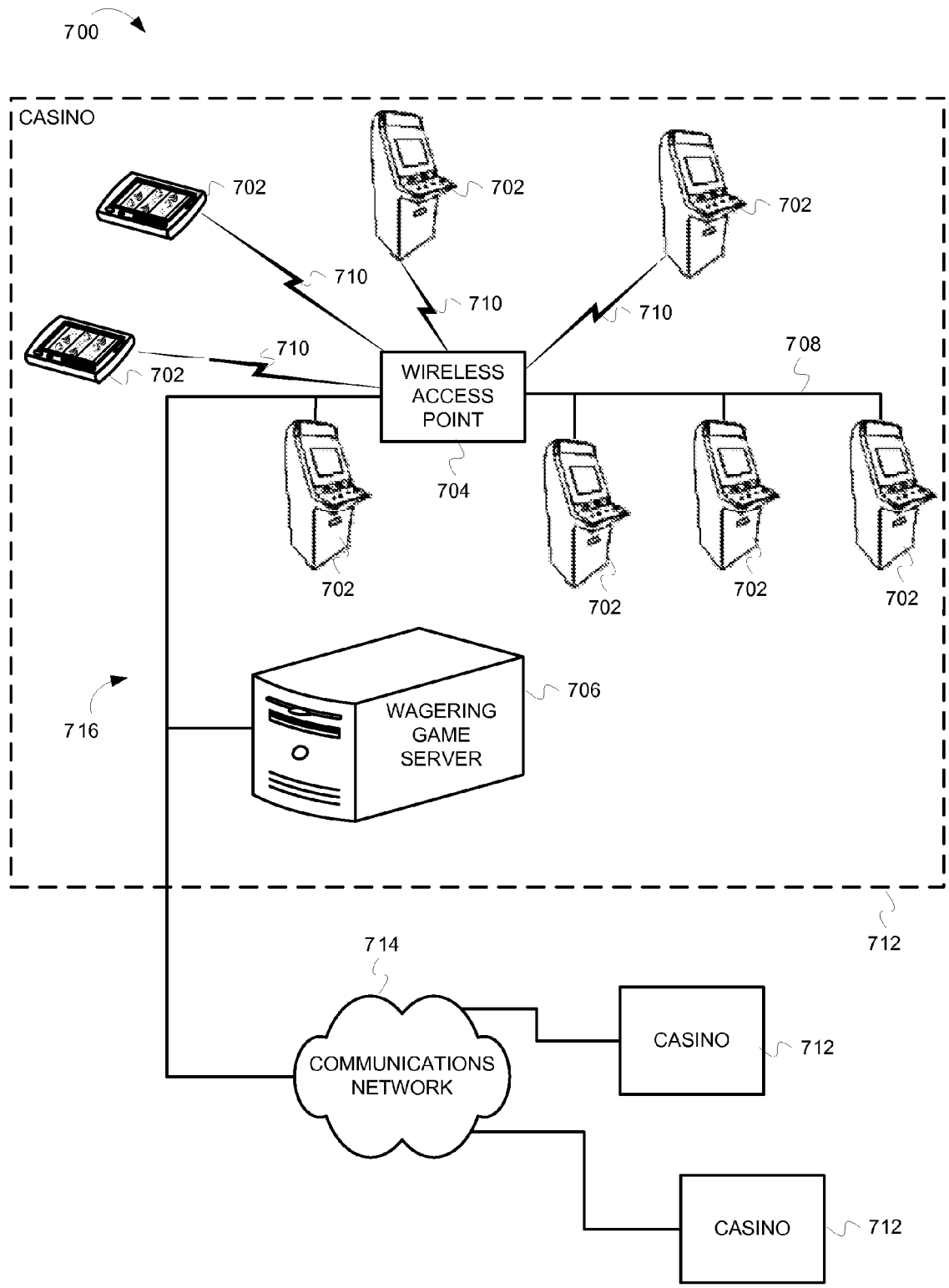
FIG. 7 is a block diagram illustrating a wagering game network 700, according to example embodiments of the invention.

FIG. 7 is a block diagram illustrating a wagering game network 700, according to example embodiments of the invention. As shown in FIG. 7, the wagering game network 700 includes a plurality of casinos 712 connected to a communications network 714.

Each casino 712 includes a local area network 716, which includes an access point 704, a wagering game server 706, and wagering game machines 702. The access point 7304 provides wireless communication links 710 and wired communication links 708. The wired and wireless communication links can employ any suitable connection technology, such as Bluetooth, 802.11, Ethernet, public switched telephone networks, SONET, etc. In some embodiments, the wagering game server 706 can serve wagering games and distribute content to devices located in other casinos 712 or at other locations on the communications network 714.

The wagering game machines 702 described herein can take any suitable form, such as floor standing models, hand-held mobile units, bartop models, workstation-type console models, etc. Further, the wagering game machines 702 can be primarily dedicated for use in conducting wagering games, or can include non-dedicated devices, such as mobile phones, personal digital assistants, personal computers, etc. One or more of the wagering game machines includes a stereoscopic 3-D display device and graphics hardware and software for performing the operations of FIG. 5. Furthermore, in some embodiments, the wagering game server 706 can include graphics hardware and software capable of performing some of the operations of FIG. 5 in concert with one or more of the wagering game machines 702.

In one embodiment, the wagering game network 700 can include other network devices, such as accounting servers, wide area progressive servers, player tracking servers, and/or other devices suitable for use in connection with embodiments of the invention.

In some embodiments, wagering game machines 702 and wagering game servers 706 work together such that a wagering game machine 702 can be operated as a thin, thick, or intermediate client. For example, one or more elements of game play may be controlled by the wagering game machine 702 (client) or the wagering game server 706 (server). Game play elements can include executable game code, lookup tables, configuration files, game outcome, audio or visual representations of the game, game assets or the like. In a thin-client example, the wagering game server 706 can perform functions such as determining game outcome or managing assets, while the wagering game machine 702 can present a graphical representation of such outcome or asset modification to the user (e.g., player). In a thick-client example, the wagering game machines 702 can determine game outcomes and communicate the outcomes to the wagering game server 706 for recording or managing a player's account.

In some embodiments, either the wagering game machines 702 (client) or the wagering game server 706 can provide functionality that is not directly related to game play. For example, account transactions and account rules may be managed centrally (e.g., by the wagering game server 706) or locally (e.g., by the wagering game machine 702). Other functionality not directly related to game play may include power management, presentation of advertising, software or firmware updates, system quality or security checks, etc.

Any of the wagering game network components (e.g., the wagering game machines 702) can include hardware and machine-readable media including instructions for performing the operations described herein.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. An apparatus comprising:
  a stereoscopic three-dimensional display device;
  a graphics unit in communication with the stereoscopic three-dimensional display device,
    the graphics unit configured to
    create a three-dimensional (3-D) wagering game space including a first group of objects;
    create a second group of objects that are a copy of the first group of objects, wherein the second group of objects includes invisible objects;
    capture a stereoscopic 3-D image in the 3-D wagering game space, wherein the first image includes some objects from the first group of objects;
    capture a two-dimensional (2-D) image in the 3-D wagering game space, wherein the second image does not include the invisible objects such that a region in the second image is transparent;
    create a composite image wherein the stereoscopic 3-D image appears in the region of the 2-D image;
    present the composite image on the stereoscopic 3-D display device;
  a wagering game unit configured to provide results of wagering games to the graphics unit for presentation on the stereoscopic 3-D display device.

2. The apparatus of claim 1, wherein the graphics unit creates a first group of virtual cameras to create the stereoscopic 3-D image.

3. The apparatus of claim 1, wherein the graphics unit creates another virtual camera to capture the 2-D image.

4. The apparatus of claim 1, wherein the objects are elements of a wagering game, wherein the elements indicate a result of the wagering game.

5. The apparatus of claim 4, wherein the certain of the objects are also elements of the wagering game.

6. The apparatus of claim 4, wherein the invisible objects are also elements of the wagering game.

7. The method of claim 6, wherein the graphics buffer includes a composite image including the 2-D image and the stereoscopic 3-D image.

8. The method of claim 6, wherein the rendering the 2-D image includes:
  performing rendering computations for some of the second group of objects;
  avoiding rendering computations for the region identified as being transparent.

9. The method of claim 6 further comprising:
  making the second virtual 3-D wagering game space visible to a second pair of virtual cameras;
  rendering another stereoscopic 3-D image to the graphics buffer, wherein the rendering the other stereoscopic 3-D image is based on data captured by the second pair of virtual cameras.

10. The method of claim 6, wherein the first and second groups of objects represent game elements in a wagering game.

11. The method of claim 7, wherein the first and second groups of objects represent game elements in a wagering game.

12. The method of claim 11, wherein the first and second groups of game elements are part of a wagering game.

13. The method of claim 11, wherein presentation of the graphics buffer results in a composite image including the stereoscopic 3-D image and the 2-D image.

14. The method of claim 11, wherein the operation for rendering, to the graphics buffer, the 2-D image does not include computations for the game elements in the second group that are invisible to the second group of one or more cameras.

15. One or more non-transitory machine-readable storage media including instructions which when executed by one or more processors cause the one or more processors to perform operations comprising:
  creating a virtual 3-D wagering game space including a region and a plurality of objects;
  labeling the region invisible and an object of the plurality of objects invisible;
  capturing, by a first pair of virtual cameras, a first image in the virtual 3-D wagering game space, wherein the first image includes objects other than the object labeled invisible;
  capturing, by a second virtual camera, a second image in the virtual 3-D wagering game space, wherein the second image includes the region and the object labeled invisible, and wherein the region and object labeled invisible are transparent in the second image;
  rendering, based on the second image, a 2-D image to the graphics buffer, wherein the region and object labeled invisible are transparent in the 2-D image;
  rendering, based on the first image, a stereoscopic 3-D image to a graphics buffer, wherein the 3-D image occupies the region of the 2-D image;
  presenting the graphics buffer on a stereoscopic 3-D display device.

16. The non-transitory machine-readable storage media of claim 15, wherein the objects represent elements in a wagering game.

17. The non-transitory machine-readable storage media of claim 16, wherein the presenting the graphics buffer presents a result for the wagering game.

18. The non-transitory machine-readable storage media of claim 15, wherein the first pair of virtual cameras and the second virtual camera have settings including one or more of: field of view, depth of focus, aperture size, and depth of field.

19. The non-transitory machine-readable storage media of claim 15, wherein the stereoscopic 3-D display displays the graphics buffer in autostereoscopic 3-D.

20. The non-transitory machine-readable storage media of claim 15, wherein presentation of the graphics buffer results in a composite image including the stereoscopic 3-D image and the 2-D image.

21. The machine-readable storage media of claim 16, wherein presentation of the graphics buffer results in a composite image including the stereoscopic 3-D image and the 2-D image.

22. The apparatus of claim 21, wherein the graphics buffer includes a composite image including the 2-D image and the stereoscopic 3-D image.

23. The apparatus of claim 21, wherein means for the rendering the 2-D image includes:
   means for performing rendering computations for some of the second group of objects that have not been marked invisible;
   means for avoiding rendering computations for the ones of the second group of objects that are marked invisible.

24. The apparatus of claim 21 further comprising:
   means for making the second virtual 3-D wagering game space visible to a second pair of virtual cameras;
   means for rendering another stereoscopic 3-D image to the graphics buffer, wherein the rendering the other stereoscopic 3-D image is based on data captured by the second pair of virtual cameras.

25. The apparatus of claim 21, wherein the first and second groups of objects represent game elements in a wagering game.

* * * * *